Figure 1:
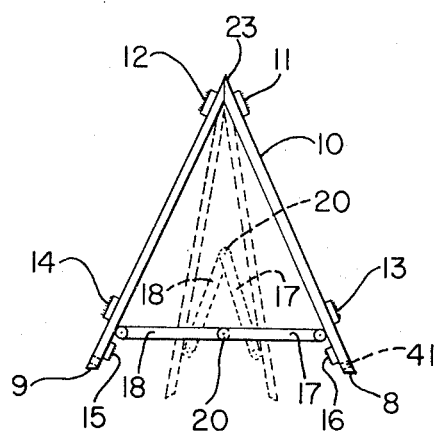

United States Patent [19]
Teixeira

[11] 3,949,701
[45] Apr. 13, 1976

[54] SAFETY MARKER

[76] Inventor: Jean Marc Teixeira, 141 Winthrop St., Brockton, Mass. 01506

[22] Filed: Oct. 18, 1974

[21] Appl. No.: 515,829

[52] U.S. Cl. ............................................. 116/63 P
[51] Int. Cl.² .......................................... E01F 9/10
[58] Field of Search .................. 116/63 P, DIG. 7; 40/125 N, 37, 39

[56] References Cited
UNITED STATES PATENTS

| | | | |
|---|---|---|---|
| 2,693,044 | 11/1954 | Roemisch | 116/DIG. 7 |
| 2,869,504 | 1/1959 | Andrews | 116/63 P |
| 2,870,557 | 1/1959 | Cook | 116/DIG. 7 |
| 2,985,976 | 5/1961 | Parker | 116/DIG. 7 |
| 3,691,526 | 9/1972 | Huntington | 40/125 N |

Primary Examiner—S. Clement Swisher
Assistant Examiner—Denis E. Corr

[57] ABSTRACT

A highly visible safety marker having a moving element enhancing visibility along with luminescent colors, incorporating a foldable character, easily storable, which can be affixed to the interior of an automobile trunk lid providing static warning whenever the trunk is open as well as occupying minimal and unused space.

5 Claims, 4 Drawing Figures

U.S. Patent   April 13, 1976   3,949,701

SAFETY MARKER

This invention relates to safety markers and more particularly a safety marker having a movable element increasing its visibility and a storagable character requiring a minimum of space.

On highways especially where high-speed automotive traffic exists, if an automobile breaks down the owner or some individual working for the highway department or a utility who must work in the road is exposed to great danger. To avoid injuries highway safety markers were long utilized and are placed in the road up stream from the broken down vehicle or individual working in the road to enable approaching motorists to reduce speed and thereby avoid hitting the individual in the road.

A safety marker commonly available and most popular are barrels painted with luminous paints or safety cones also painted with luminous paint. These cones or barrels are placed on the highway up stream. The barrel having a much larger bulk is more visible than the cone. However, the barrel is impossible to store whereas the cone can be piled one on top of each other and stored in a truck occupying a limited amount of space. The use of cones solves the problem for highway departments which have large open areas in trucks but it does nothing for the motorist nor for the public utility which have limited space because of the requirement for cargo needed for work on various projects.

The present inventor, therefore, discovered that he could provide a highly visible unit which could be folded and stored in a motor vehicle or on the back of a utility truck in a flat profile (a great many of these units can be stored in less space than a cone) and be available for utilization up stream on a high-speed road thus preventing accidents and injuries to the person who is broken down and in the road.

The storagable cone and barrel in common did not provide any moving element. The present inventor has discovered by inserting a movable element which is excited by the ordinary passage of currents of air along the highway will draw the attention of the on coming motorist greater than a longer static unit which will enable the motorist to better see the device and respond by reducing his speed before he reaches the individual in the roadway. Accordingly, the present invention incorporates blades or fins which are excited by movements of air and are so disposed and arranged so as not to prevent the unit from being foldable and thereby storagable.

Once a unit is stored in a motor vehicle, it can get destroyed if not used for any long period of time. Accordingly, the present inventor has discovered by providing attachment means on the trunk lid the device may be stored on the lid which will provide even in a storage position a warning for on coming traffic when the truck lid is left open. Moreover, it can be easily removed from the trunk lid and placed on the highway far enough up stream to avoid the high speed on coming motorist's vehicles from crashing into the user's motor vehicle. Furthermore, when the stored unit is removed from the trunk lid and opened up, its activated blades draw even greater attention to its existence. However, by having the unit storagable and affixable to the trunk lid the device remains clean and useful over prolonged periods of time.

Therefore, an object of the present invention, is to provide a low-profile storagable safety marker.

Another object of the present invention is to provide a safety marker which can be affixed to the inside of an automobile trunk lid.

Another object of the present invention, is to provide a safety marker having activated blades for drawing attention to its existence.

Figure 2:
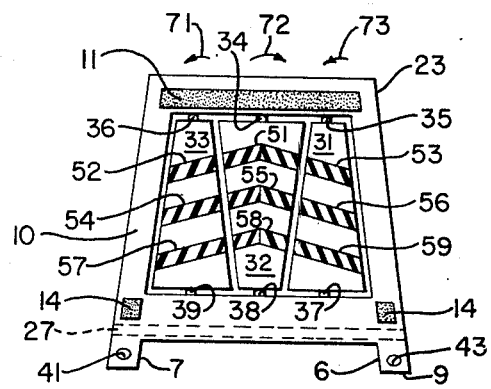
Figure 3:
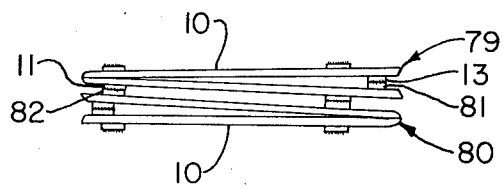
Figure 4:
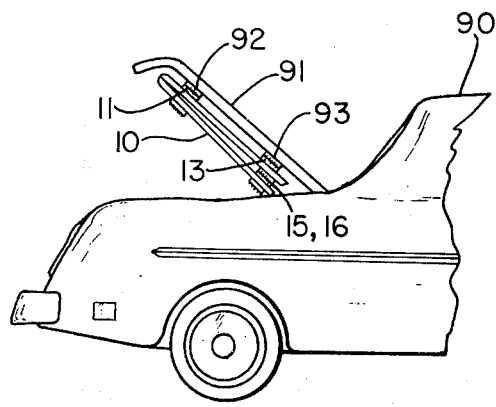

Other objects, features and advantages of the present invention will be better understood from the following drawings of which:

FIG. 1 is an end view of the present invention.
FIG. 2 is a strait-on view of the present invention.
FIG. 3 shows two units stacked together.
FIG. 4 shows the unit attached to a trunk lid.

Referring now to FIG. 1, we see Safety marker 10. We note tufted elements 11, 12, 13, 16, and 15 which are all made from identical material. They are tufted nylon bristles which interact with a mating tufted nylon strip causing the two to adhere to one another. This material is well known in the art and will not be described further. However, one popular manufacturer refers to their material as Velcore.

The legs 8 and 9 of the unit are stretched out when in use, and peak 23, being of flexible plastic, permits the legs to be separated. A platform is made of two parts 17 and 18 and bearing 20 connects the two together. Section 17 is slotted so as to mate with section 18. When the two units are pushed down they make a platform as shown. When pressed upward they rotate about their sockets 22 and 27, such that the legs 8 and 9 can be pressed together causing tufted core 15 and 16 to press against one another locking the triangular shaped safety marker in a flat profile. We note that tufted cores 11 and 13 on the legs have corresponding units on the opposite side. This permits easy storage of the unit as will be explained later affixed to the back of a trunk lid. Users will be able to stack several of these units in a flat profile, that will also be explained further.

Referring now to FIG. 2 we see the safety marker in a straight on profile. Legs 8 and 9 are now switched over such that we see only one leg 8 straight on. Both sides front and back of the unit are identical, accordingly, they will be viewed, discussed describing only one side.

The safety marker now, with its legs spread can be placed on the highway, upstream from the danger point such that motorists will be able to see the unit as they approach the working area. We see tufted velcore pads 11 and 14 direct on. These, of course, mate with corresponding units to stack or to store affixed to a trunk lid. We also note movable elements 31, 32, and 33. These elements are triangular in shape and rotate about their respective bearings at the top 35, 34, and 36, and at the bottom 37, 38 and 39. The units are placed triangularly to provide an unbalanced condition such that the units will turn at a different frequency than corresponding elements. Moreover, they do not depend upon wind direction and will be able to catch the slightest breeze to begin rotating. The units have painted thereon, luminous triangular stripe 52, 54 and 58, and on the corresponding elements 51, 55, 58, 50, 53, 56, and 59.

When the elements are lined up they make up a static appearance, which is nevertheless an attention getter. But once placed on the roadway the three elements on both sides move with respect to one another constantly, thereby, drawing attention to the existence of the safety marker. It is seen that a safety marker can be approximately 3 or 4 feet high, and about 1 or 2 feet wide, such that a rather substantial safety marker is presented to on coming traffic. The size can also be much smaller.

The frame of the safety marker 10 holding the movable elements is also painted with a bright luminescent paint, in order to be an attention getter, independent of the rotating elements. Extending 6 and 7 of legs 9 and corresponding an extention of leg 8 if the unit were flipped over, have provisions to make the units stable on the ground. A hole 41 is provided and can be seen having a sloping base in FIG. 1, provides the means to have spikes driven into the ground thereby holding the unit firmly in the ground. We also note at the bottom of 6 a hole 43 which can accommodate a small magnet which permits the unit to be placed on top of a automobile or other metal surface and held securely in place.

Referring again to FIG. 1, the platform formed by 17 and 18 also permit one to place rocks or some other heavy object in the center of the unit, providing additional weight to keep the unit where placed even during a rather substantial wind storm where very high speeds are experienced, as well as prevent the unit from being disturbed by air currents when the high velocity motor vehicles pass the safety marker on the road.

The unit will be cast in a thin plastic material with enough substance, of course, to provide a sturdy frame. The end section 23 is contoured as a hinge to permit movement of the legs 8 and 9. The unit is also notched out of grooved at 21 and 22 to receive the formed platform 17 and 18. The tip of 17 and 18 are so arranged that they lock into the slotted or grooved leg. Movable elements 31, 32 and 33 are of substantially thinner material and will be painted on both sides identically, so that when an element turns another luminescent surface appears. The color difference between sides of the movable should be dramatically different from one another in order to amplify the motion that the elements presents as they rotate in the safety marker on the roadway.

Referring now to FIG. 3, we see safety markers 79 and 80 they have which was discussed earlier tufted elements 11 and 13. They mate with of course corresponding tufted elements on unit 80, 81 and 82. This permits units to be stacked in large numbers on utility vehicles or highway safety vehicles such that multiple safety markers can be placed in a very small storage space and when needed they can be separated from one another and placed on the roadway just as the cones that are used now for markers on the highway.

Referring now to FIG. 4, we see an automobile 90 with its trunk lid 91 held opened. Two tuft cores 92 and 93 have an affixed to the inside metal surface of the trunk lid. A safety marker then having mating tuft elements 11 and 13 are pressed up against their corresponding tufted core elements and the safety marker is therefore locked to the trunk lid.

When the user has trouble on the highway, he pulls his car over and lifts his trunk lid immediately there is a safety marker preventing on coming automobiles from running into the back of his car. He then can remove the unit by pulling out the tufted cores from one another take the unit and put it up stream separate the legs and leave it to prevent the high speed cars from coming and running into him. By putting the unit upstream he does two things he gives a greater margin of warning to the on coming motorist and also by separating the legs produces or releases the moving elements and as a result of the wind from the passing motor vehicles and other air currents the elements rotate creating a much greater attention getter preventing possible accidents.

Although I have described my invention with reference to specific apparatus I do not wish to be limited thereto. I only wish to be limited by the appendent claims because those skilled in the art may make many substitutions are variations from this invention without departing from its true, scope and spirit.

I claim:
1. A safety marker comprising,
   a first flat frame,
   a second flat frame,
   means for movably joining said frames at one end to form a triangle stance in use and a flat profile in storage,
   means for holding the bases of said frames apart when in use,
   means for holding said frames separatably together for storage in a flat profile,
   means for separatably affixing said frames with cooperating means ridgidly affixed to a selected surface or other safety marker having corresponding affixing means,
   blade means rotatably mounted within said frames whereby attention is drawn to the moving blades by motorists approaching said safety marker.
2. A safety marker according to claim 1 wherein said frame is painted a bright iridescent color.
3. A safety marker according to claim 2 wherein said blades have opposing triangular shapes and painted with sloping stripes of contracting iridescent color paints,
4. A safety marker according to claim 3 wherein said blades are contoured along their axis to increase their motion.
5. A safety marker according to claim 4 wherein said frame base separating means forms a platform for receiving weight such as a rock whereby the frames are held erect in heavy wind currents.

* * * * *